(12) United States Patent
Saito

(10) Patent No.: US 8,356,882 B2
(45) Date of Patent: Jan. 22, 2013

(54) DOT PRINTING SYSTEM, DOT PRINTING METHOD AND COMPUTER PROGRAM

(75) Inventor: Toshiki Saito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 306 days.

(21) Appl. No.: 12/700,636

(22) Filed: Feb. 4, 2010

(65) Prior Publication Data
US 2010/0201731 A1 Aug. 12, 2010

(30) Foreign Application Priority Data

Feb. 6, 2009 (JP) ................................. 2009-025561

(51) Int. Cl.
*B41J 2/15* (2006.01)
(52) U.S. Cl. .......................................... 347/41; 347/20
(58) Field of Classification Search ..................... 347/20, 347/41, 12
See application file for complete search history.

(56) References Cited

U.S. PATENT DOCUMENTS

| 6,315,387 | B1 |   | 11/2001 | Horikoshi |  |
|---|---|---|---|---|---|
| 6,435,651 | B1 | * | 8/2002 | Otsuki et al. | 347/41 |
| 6,454,389 | B1 | * | 9/2002 | Couwenhoven et al. | 347/40 |
| 6,561,610 | B2 |   | 5/2003 | Yamasaki et al. |  |
| 6,963,423 | B2 | * | 11/2005 | Ogasahara et al. | 358/1.8 |
| 2006/0181563 | A1 |   | 8/2006 | Niekawa |  |
| 2008/0316258 | A1 | * | 12/2008 | Nino | 347/41 |
| 2008/0316259 | A1 | * | 12/2008 | Nino | 347/41 |
| 2009/0073226 | A1 | * | 3/2009 | Chikuma | 347/41 |

FOREIGN PATENT DOCUMENTS

| AD | WO 2006/018987 A1 | 2/2006 |
|---|---|---|
| JP | 11-170502 | 6/1999 |
| JP | 2000-079681 A | 3/2000 |
| JP | 2001-030522 A | 2/2001 |
| JP | 2002-292848 A | 10/2002 |
| JP | 2007-055202 A | 3/2007 |
| JP | 2007-203717 A | 8/2007 |

* cited by examiner

*Primary Examiner* — Julian Huffman
*Assistant Examiner* — Sharon A Polk
(74) *Attorney, Agent, or Firm* — Kilpatrick Townsend & Stockton LLP

(57) ABSTRACT

A printing apparatus includes an omitting processor that performs an omitting process in which dots are not printed at one or more of the main scanning passes. The omitting processor performs the omitting process by selecting a combination of the first and second main scanning passes such that a difference between the first main scanning pass number and the second main scanning pass number is lower than for other possible combinations of the first and second main scanning pass numbers; utilizing the selected combination of the first and second main scanning passes to print the dots; and omitting at least one other possible first or second main scanning pass. Also disclosed are a printing method and computer program product.

6 Claims, 11 Drawing Sheets

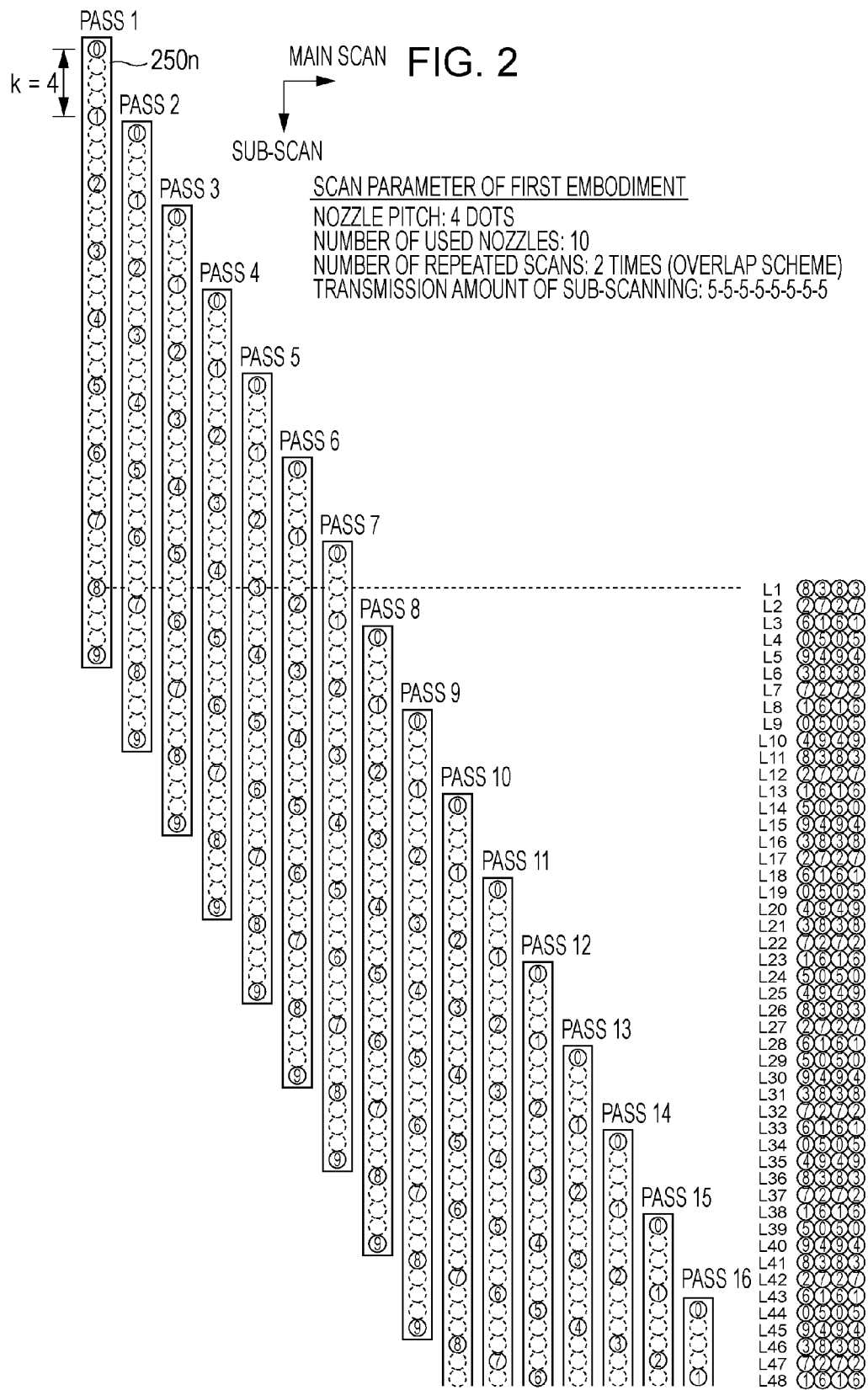

FIG. 3A
DOT SIZE
LARGE SIZE DOT 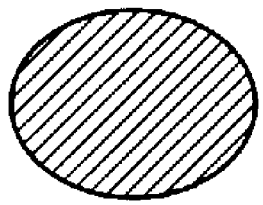   MEDIUM SIZE DOT 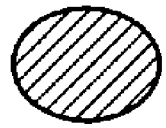   SMALL SIZE DOT 
FIG. 3B
DOT PRINTING OF BETA ZONE
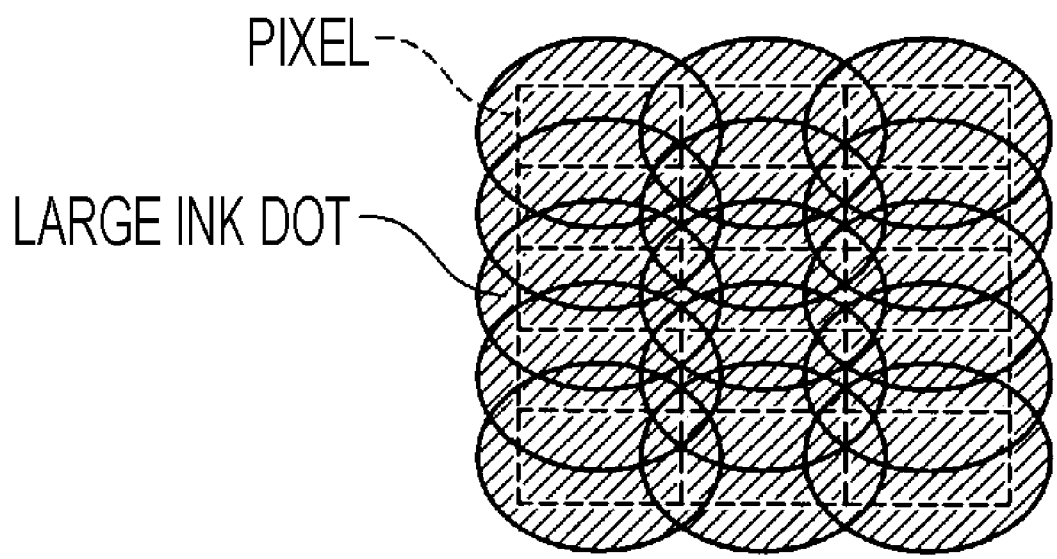

FIG. 4A  NON-THINNING

| | | | | |
|---|---|---|---|---|
| L1 | 1-8 | 5-3 | 1-8 | 5-3 |
| L2 | 6-2 | 2-7 | 6-2 | 2-7 |
| L3 | 3-6 | 7-1 | 3-6 | 7-1 |
| L4 | 8-0 | 4-5 | 8-0 | 4-5 |
| L5 | 1-9 | 5-4 | 1-9 | 5-4 |
| L6 | 6-3 | 2-8 | 6-3 | 2-8 |
| L7 | 3-7 | 7-2 | 3-7 | 7-2 |
| L8 | 8-1 | 4-5 | 8-1 | 4-5 |
| L9 | 9-0 | 5-5 | 9-0 | 5-5 |
| L10 | 6-4 | 2-9 | 6-4 | 2-9 |
| L11 | 3-8 | 7-3 | 3-8 | 7-3 |
| L12 | 8-2 | 4-7 | 8-2 | 4-7 |
| L13 | 9-1 | 5-6 | 9-1 | 5-6 |
| L14 | 6-5 | 10-0 | 6-5 | 10-0 |
| L15 | 3-9 | 7-4 | 3-9 | 7-4 |
| L16 | 8-3 | 4-8 | 8-3 | 4-8 |
| L17 | 9-2 | 5-7 | 9-2 | 5-7 |
| L18 | 6-6 | 10-1 | 6-6 | 10-1 |
| L19 | 11-0 | 7-5 | 11-0 | 7-5 |
| L20 | 8-4 | 4-9 | 8-4 | 4-9 |
| L21 | 9-3 | 5-8 | 9-3 | 5-8 |
| L22 | 6-7 | 10-2 | 6-7 | 10-2 |
| L23 | 11-1 | 7-6 | 11-1 | 7-6 |
| L24 | 8-5 | 12-0 | 8-5 | 12-0 |
| L25 | 9-4 | 5-9 | 9-4 | 5-9 |
| L26 | 6-8 | 10-3 | 6-8 | 10-3 |
| L27 | 11-2 | 7-7 | 11-2 | 7-7 |
| L28 | 8-6 | 12-1 | 8-6 | 12-1 |
| L29 | 9-5 | 13-0 | 9-5 | 13-0 |
| L30 | 6-9 | 10-4 | 6-9 | 10-4 |
| L31 | 11-3 | 7-8 | 11-3 | 7-8 |
| L32 | 8-7 | 12-2 | 8-7 | 12-2 |
| L33 | 9-6 | 13-1 | 9-6 | 13-1 |
| L34 | 14-0 | 10-5 | 14-0 | 10-5 |
| L35 | 11-4 | 7-9 | 11-4 | 7-9 |
| L36 | 8-8 | 12-3 | 8-8 | 12-3 |
| L37 | 9-7 | 13-2 | 9-7 | 13-2 |
| L38 | 14-1 | 10-6 | 14-1 | 10-6 |
| L39 | 11-5 | 15-0 | 11-5 | 15-0 |
| L40 | 8-9 | 12-4 | 8-9 | 12-4 |
| L41 | 9-8 | 13-3 | 9-8 | 13-3 |
| L42 | 14-2 | 10-7 | 14-2 | 10-7 |
| L43 | 11-6 | 15-1 | 11-6 | 15-1 |
| L44 | 16-0 | 12-5 | 16-0 | 12-5 |
| L45 | 9-9 | 13-4 | 9-9 | 13-4 |
| L46 | 14-3 | 10-8 | 14-3 | 10-8 |
| L47 | 11-7 | 15-2 | 11-7 | 15-2 |
| L48 | 16-1 | 12-6 | 16-1 | 12-6 |

MEANING OF SYMBOL:
[PASS NUMBER]-[NOZZLE NUMBER]

FIG. 4B  COMPARATIVE EMBODIMENT (EVEN NUMBER ROW THINNING)

| | | | | |
|---|---|---|---|---|
| L1 | 1-8 | | 1-8 | |
| L2 | 6-2 | | 6-2 | |
| L3 | 3-6 | | 3-6 | |
| L4 | 8-0 | | 8-0 | |
| L5 | 1-9 | | 1-9 | |
| L6 | 6-3 | | 6-3 | |
| L7 | 3-7 | | 3-7 | |
| L8 | 8-1 | | 8-1 | |
| L9 | 9-0 | | 9-0 | |
| L10 | 6-4 | | 6-4 | |
| L11 | 3-8 | | 3-8 | |
| L12 | 8-2 | | 8-2 | |
| L13 | 9-1 | | 9-1 | |
| L14 | 6-5 | | 6-5 | |
| L15 | 3-9 | | 3-9 | |
| L16 | 8-3 | | 8-3 | |
| L17 | 9-2 | | 9-2 | |
| L18 | 6-6 | | 6-6 | |
| L19 | 11-0 | | 11-0 | |
| L20 | 8-4 | | 8-4 | |
| L21 | 9-3 | | 9-3 | |
| L22 | 6-7 | | 6-7 | |
| L23 | 11-1 | | 11-1 | |
| L24 | 8-5 | | 8-5 | |
| L25 | 9-4 | | 9-4 | |
| L26 | 6-8 | | 6-8 | |
| L27 | 11-2 | | 11-2 | |
| L28 | 8-6 | | 8-6 | |
| L29 | 9-5 | | 9-5 | |
| L30 | 6-9 | | 6-9 | |
| L31 | 11-3 | | 11-3 | |
| L32 | 8-7 | | 8-7 | |
| L33 | 9-6 | | 9-6 | |
| L34 | 14-0 | | 14-0 | |
| L35 | 11-4 | | 11-4 | |
| L36 | 8-8 | | 8-8 | |
| L37 | 9-7 | | 9-7 | |
| L38 | 14-1 | | 14-1 | |
| L39 | 11-5 | | 11-5 | |
| L40 | 8-9 | | 8-9 | |
| L41 | 9-8 | | 9-8 | |
| L42 | 14-2 | | 14-2 | |
| L43 | 11-6 | | 11-6 | |
| L44 | 16-0 | | 16-0 | |
| L45 | 9-9 | | 9-9 | |
| L46 | 14-3 | | 14-3 | |
| L47 | 11-7 | | 11-7 | |
| L48 | 16-1 | | 16-1 | |

(BLANK PIXEL POSITIONS HAVE NO DOT PRINTING)

FIG. 5A  NON-THINNING

| | | | | |
|---|---|---|---|---|
| L1 | 1-8 | 5-3 | 1-8 | 5-3 |
| L2 | 6-2 | 2-7 | 6-2 | 2-7 |
| L3 | 3-6 | 7-1 | 3-6 | 7-1 |
| L4 | 8-0 | 4-5 | 8-0 | 4-5 |
| L5 | 1-9 | 5-4 | 1-9 | 5-4 |
| L6 | 6-3 | 2-8 | 6-3 | 2-8 |
| L7 | 3-7 | 7-2 | 3-7 | 7-2 |
| L8 | 8-1 | 4-5 | 8-1 | 4-5 |
| L9 | 9-0 | 5-5 | 9-0 | 5-5 |
| L10 | 6-4 | 2-9 | 6-4 | 2-9 |
| L11 | 3-8 | 7-3 | 3-8 | 7-3 |
| L12 | 8-2 | 4-7 | 8-2 | 4-7 |
| L13 | 9-1 | 5-6 | 9-1 | 5-6 |
| L14 | 6-5 | 10-0 | 6-5 | 10-0 |
| L15 | 3-9 | 7-4 | 3-9 | 7-4 |
| L16 | 8-3 | 4-8 | 8-3 | 4-8 |
| L17 | 9-2 | 5-7 | 9-2 | 5-7 |
| L18 | 6-6 | 10-1 | 6-6 | 10-1 |
| L19 | 11-0 | 7-5 | 11-0 | 7-5 |
| L20 | 8-4 | 4-9 | 8-4 | 4-9 |
| L21 | 9-3 | 5-8 | 9-3 | 5-8 |
| L22 | 6-7 | 10-2 | 6-7 | 10-2 |
| L23 | 11-1 | 7-6 | 11-1 | 7-6 |
| L24 | 8-5 | 12-0 | 8-5 | 12-0 |
| L25 | 9-4 | 5-9 | 9-4 | 5-9 |
| L26 | 6-8 | 10-3 | 6-8 | 10-3 |
| L27 | 11-2 | 7-7 | 11-2 | 7-7 |
| L28 | 8-6 | 12-1 | 8-6 | 12-1 |
| L29 | 9-5 | 13-0 | 9-5 | 13-0 |
| L30 | 6-9 | 10-4 | 6-9 | 10-4 |
| L31 | 11-3 | 7-8 | 11-3 | 7-8 |
| L32 | 8-7 | 12-2 | 8-7 | 12-2 |
| L33 | 9-6 | 13-1 | 9-6 | 13-1 |
| L34 | 14-0 | 10-5 | 14-0 | 10-5 |
| L35 | 11-4 | 7-9 | 11-4 | 7-9 |
| L36 | 8-8 | 12-3 | 8-8 | 12-3 |
| L37 | 9-7 | 13-2 | 9-7 | 13-2 |
| L38 | 14-1 | 10-6 | 14-1 | 10-6 |
| L39 | 11-5 | 15-0 | 11-5 | 15-0 |
| L40 | 8-9 | 12-4 | 8-9 | 12-4 |
| L41 | 9-8 | 13-3 | 9-8 | 13-3 |
| L42 | 14-2 | 10-7 | 14-2 | 10-7 |
| L43 | 11-6 | 15-1 | 11-6 | 15-1 |
| L44 | 16-0 | 12-5 | 16-0 | 12-5 |
| L45 | 9-9 | 13-4 | 9-9 | 13-4 |
| L46 | 14-3 | 10-8 | 14-3 | 10-8 |
| L47 | 11-7 | 15-2 | 11-7 | 15-2 |
| L48 | 16-1 | 12-6 | 16-1 | 12-6 |

MEANING OF SYMBOL:
[PASS NUMBER]-[NOZZLE NUMBER]

FIG. 5B  FIRST EMBODIMENT (OVERLAP CONSIDERED DOT THINNING)

| | | | | |
|---|---|---|---|---|
| L1 | | 5-3 | | 5-3 |
| L2 | 6-2 | | 6-2 | |
| L3 | | 7-1 | | 7-1 |
| L4 | 8-0 | | 8-0 | |
| L5 | | 5-4 | | 5-4 |
| L6 | 6-3 | | 6-3 | |
| L7 | | 7-2 | | 7-2 |
| L8 | 8-1 | | 8-1 | |
| L9 | 9-0 | | 9-0 | |
| L10 | 6-4 | | 6-4 | |
| L11 | | 7-3 | | 7-3 |
| L12 | 8-2 | | 8-2 | |
| L13 | 9-1 | | 9-1 | |
| L14 | | 10-0 | | 10-0 |
| L15 | | 7-4 | | 7-4 |
| L16 | 8-3 | | 8-3 | |
| L17 | 9-2 | | 9-2 | |
| L18 | | 10-1 | | 10-1 |
| L19 | 11-0 | | 11-0 | |
| L20 | 8-4 | | 8-4 | |
| L21 | 9-3 | | 9-3 | |
| L22 | | 10-2 | | 10-2 |
| L23 | 11-1 | | 11-1 | |
| L24 | | 12-0 | | 12-0 |
| L25 | 9-4 | | 9-4 | |
| L26 | | 10-3 | | 10-3 |
| L27 | 11-2 | | 11-2 | |
| L28 | | 12-1 | | 12-1 |
| L29 | | 13-0 | | 13-0 |
| L30 | | 10-4 | | 10-4 |
| L31 | 11-3 | | 11-3 | |
| L32 | | 12-2 | | 12-2 |
| L33 | | 13-1 | | 13-1 |
| L34 | 14-0 | | 14-0 | |
| L35 | 11-4 | | 11-4 | |
| L36 | | 12-3 | | 12-3 |
| L37 | | 13-2 | | 13-2 |
| L38 | 14-1 | | 14-1 | |
| L39 | | 15-0 | | 15-0 |
| L40 | | 12-4 | | 12-4 |
| L41 | | 13-3 | | 13-3 |
| L42 | 14-2 | | 14-2 | |
| L43 | | 15-1 | | 15-1 |
| L44 | 16-0 | | 16-0 | |
| L45 | | 13-4 | | 13-4 |
| L46 | 14-3 | | 14-3 | |
| L47 | | 15-2 | | 15-2 |
| L48 | 16-1 | | 16-1 | |

(BLANK PIXEL POSITIONS HAVE NO DOT PRINTING)

FIG. 7A
NON-THINNING
FIG. 7B
EVEN NUMBER
ROW THINNING
FIG. 7C
OVERLAP CONSIDERED
THINNING
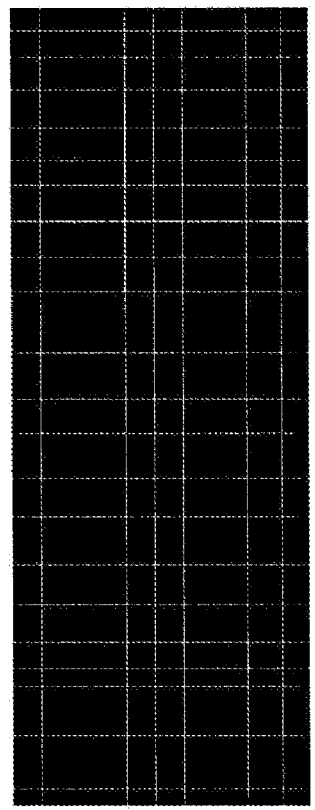

FIG. 8A
NON-THINNING

| | | | | |
|---|---|---|---|---|
| L1 | 1-8 | 5-3 | 1-8 | 5-3 |
| L2 | 6-2 | 2-7 | 6-2 | 2-7 |
| L3 | 3-6 | 7-1 | 3-6 | 7-1 |
| L4 | 8-0 | 4-5 | 8-0 | 4-5 |
| L5 | 1-9 | 5-4 | 1-9 | 5-4 |
| L6 | 6-3 | 2-8 | 6-3 | 2-8 |
| L7 | 3-7 | 7-2 | 3-7 | 7-2 |
| L8 | 8-1 | 4-5 | 8-1 | 4-5 |
| L9 | 9-0 | 5-5 | 9-0 | 5-5 |
| L10 | 6-4 | 2-9 | 6-4 | 2-9 |
| L11 | 3-8 | 7-3 | 3-8 | 7-3 |
| L12 | 8-2 | 4-7 | 8-2 | 4-7 |
| L13 | 9-1 | 5-6 | 9-1 | 5-6 |
| L14 | 6-5 | 10-0 | 6-5 | 10-0 |
| L15 | 3-9 | 7-4 | 3-9 | 7-4 |
| L16 | 8-3 | 4-8 | 8-3 | 4-8 |
| L17 | 9-2 | 5-7 | 9-2 | 5-7 |
| L18 | 6-6 | 10-1 | 6-6 | 10-1 |
| L19 | 11-0 | 7-5 | 11-0 | 7-5 |
| L20 | 8-4 | 4-9 | 8-4 | 4-9 |
| L21 | 9-3 | 5-8 | 9-3 | 5-8 |
| L22 | 6-7 | 10-2 | 6-7 | 10-2 |
| L23 | 11-1 | 7-6 | 11-1 | 7-6 |
| L24 | 8-5 | 12-0 | 8-5 | 12-0 |
| L25 | 9-4 | 5-9 | 9-4 | 5-9 |
| L26 | 6-8 | 10-3 | 6-8 | 10-3 |
| L27 | 11-2 | 7-7 | 11-2 | 7-7 |
| L28 | 8-6 | 12-1 | 8-6 | 12-1 |
| L29 | 9-5 | 13-0 | 9-5 | 13-0 |
| L30 | 6-9 | 10-4 | 6-9 | 10-4 |
| L31 | 11-3 | 7-8 | 11-3 | 7-8 |
| L32 | 8-7 | 12-2 | 8-7 | 12-2 |
| L33 | 9-6 | 13-1 | 9-6 | 13-1 |
| L34 | 14-0 | 10-5 | 14-0 | 10-5 |
| L35 | 11-4 | 7-9 | 11-4 | 7-9 |
| L36 | 8-8 | 12-3 | 8-8 | 12-3 |
| L37 | 9-7 | 13-2 | 9-7 | 13-2 |
| L38 | 14-1 | 10-6 | 14-1 | 10-6 |
| L39 | 11-5 | 15-0 | 11-5 | 15-0 |
| L40 | 8-9 | 12-4 | 8-9 | 12-4 |
| L41 | 9-8 | 13-3 | 9-8 | 13-3 |
| L42 | 14-2 | 10-7 | 14-2 | 10-7 |
| L43 | 11-6 | 15-1 | 11-6 | 15-1 |
| L44 | 16-0 | 12-5 | 16-0 | 12-5 |
| L45 | 9-9 | 13-4 | 9-9 | 13-4 |
| L46 | 14-3 | 10-8 | 14-3 | 10-8 |
| L47 | 11-7 | 15-2 | 11-7 | 15-2 |
| L48 | 16-1 | 12-6 | 16-1 | 12-6 |

MEANING OF SYMBOL:
[PASS NUMBER]-[NOZZLE NUMBER]

FIG. 8B
COMPARATIVE EMBODIMENT OF FIRST EMBODIMENT

| | | | | |
|---|---|---|---|---|
| L1 | | 5-3 | | 5-3 |
| L2 | 6-2 | | 6-2 | |
| L3 | | 7-1 | | 7-1 |
| L4 | 8-0 | | 8-0 | |
| L5 | | 5-4 | | 5-4 |
| L6 | 6-3 | | 6-3 | |
| L7 | | 7-2 | | 7-2 |
| L8 | 8-1 | | 8-1 | |
| L9 | | 5-5 | | 5-5 |
| L10 | 6-4 | | 6-4 | |
| L11 | | 7-3 | | 7-3 |
| L12 | 8-2 | | 8-2 | |
| L13 | | 5-6 | | 5-6 |
| L14 | 6-5 | | 6-5 | |
| L15 | | 7-4 | | 7-4 |
| L16 | 8-3 | | 8-3 | |
| L17 | | 5-7 | | 5-7 |
| L18 | 6-6 | | 6-6 | |
| L19 | | 7-5 | | 7-5 |
| L20 | 8-4 | | 8-4 | |
| L21 | | 5-8 | | 5-8 |
| L22 | 6-7 | | 6-7 | |
| L23 | | 7-6 | | 7-6 |
| L24 | 8-5 | | 8-5 | |
| L25 | | 5-9 | | 5-9 |
| L26 | 6-8 | | 6-8 | |
| L27 | | 7-7 | | 7-7 |
| L28 | 8-6 | | 8-6 | |
| L29 | | 13-0 | | 13-0 |
| L30 | 6-9 | | 6-9 | |
| L31 | | 7-8 | | 7-8 |
| L32 | 8-7 | | 8-7 | |
| L33 | | 13-1 | | 13-1 |
| L34 | 14-0 | | 14-0 | |
| L35 | | 7-9 | | 7-9 |
| L36 | 8-8 | | 8-8 | |
| L37 | | 13-2 | | 13-2 |
| L38 | 14-1 | | 14-1 | |
| L39 | | 15-0 | | 15-0 |
| L40 | 8-9 | | 8-9 | |
| L41 | | 13-3 | | 13-3 |
| L42 | 14-2 | | 14-2 | |
| L43 | | 15-1 | | 15-1 |
| L44 | 16-0 | | 16-0 | |
| L45 | | 13-4 | | 13-4 |
| L46 | 14-3 | | 14-3 | |
| L47 | | 15-2 | | 15-2 |
| L48 | 16-1 | | 16-1 | |

(BLANK PIXEL POSITIONS HAVE NO DOT PRINTING)

SINCE THERE IS JUMP OF PASS NUMBER IN NEIGHBORING RASTERS, IT IS EASY TO GENERATE BANDING OF HORIZONTAL DIRECTION

NON-THINNING

EVEN NUMBER ROW THINNING

OVERLAP CONSIDERED THINNING

FIG. 11A NON-THINNING

| | | | | |
|---|---|---|---|---|
| L1 | 1-8 | 5-3 | 1-8 | 5-3 |
| L2 | 8-1 | 4-6 | 8-1 | 4-6 |
| L3 | 3-7 | 7-3 | 3-7 | 7-3 |
| L4 | 6-3 | 2-8 | 6-3 | 2-8 |
| L5 | 1-9 | 5-4 | 1-9 | 5-4 |
| L6 | 8-2 | 4-7 | 8-2 | 4-7 |
| L7 | 3-8 | 7-3 | 3-8 | 7-3 |
| L8 | 6-4 | 2-9 | 6-4 | 2-9 |
| L9 | 9-0 | 5-5 | 9-0 | 5-5 |
| L10 | 8-3 | 4-8 | 8-3 | 4-8 |
| L11 | 3-9 | 7-4 | 3-9 | 7-4 |
| L12 | 6-5 | 10-0 | 6-5 | 10-0 |
| L13 | 9-1 | 5-6 | 9-1 | 5-6 |
| L14 | 8-4 | 4-9 | 8-4 | 4-9 |
| L15 | 11-0 | 7-5 | 11-0 | 7-5 |
| L16 | 6-6 | 10-1 | 6-6 | 10-1 |
| L17 | 9-2 | 5-7 | 9-2 | 5-7 |
| L18 | 8-5 | 12-0 | 8-5 | 12-0 |
| L19 | 11-1 | 7-6 | 11-1 | 7-6 |
| L20 | 6-7 | 10-2 | 6-7 | 10-2 |
| L21 | 9-3 | 5-8 | 9-3 | 5-8 |
| L22 | 8-6 | 12-1 | 8-6 | 12-1 |
| L23 | 11-2 | 7-7 | 11-2 | 7-7 |
| L24 | 6-8 | 10-3 | 6-8 | 10-3 |
| L25 | 9-4 | 5-9 | 9-4 | 5-9 |
| L26 | 8-7 | 12-2 | 8-7 | 12-2 |
| L27 | 11-3 | 7-8 | 11-3 | 7-8 |
| L28 | 6-9 | 10-4 | 6-9 | 10-4 |
| L29 | 9-5 | 13-0 | 9-5 | 13-0 |
| L30 | 8-8 | 12-3 | 8-8 | 12-3 |
| L31 | 11-4 | 7-9 | 11-4 | 7-9 |
| L32 | 14-0 | 10-5 | 14-0 | 10-5 |
| L33 | 9-6 | 13-1 | 9-6 | 13-1 |
| L34 | 8-9 | 12-4 | 8-9 | 12-4 |
| L35 | 11-5 | 15-0 | 11-5 | 15-0 |
| L36 | 14-1 | 10-6 | 14-1 | 10-6 |
| L37 | 9-7 | 13-2 | 9-7 | 13-2 |
| L38 | 16-0 | 12-5 | 16-0 | 12-5 |
| L39 | 11-6 | 15-1 | 11-6 | 15-1 |
| L40 | 14-2 | 10-7 | 14-2 | 10-7 |
| L41 | 9-8 | 13-3 | 9-8 | 13-3 |
| L42 | 16-1 | 12-6 | 16-1 | 12-6 |
| L43 | 11-7 | 15-2 | 11-7 | 15-2 |
| L44 | 14-3 | 10-8 | 14-3 | 10-8 |
| L45 | 9-9 | 13-4 | 9-9 | 13-4 |
| L46 | 16-2 | 12-7 | 16-2 | 12-7 |
| L47 | 11-8 | 15-3 | 11-8 | 15-3 |
| L48 | 14-4 | 10-9 | 14-4 | 10-9 |

MEANING OF SYMBOL:
[PASS NUMBER]-[NOZZLE NUMBER]

FIG. 11B SECOND EMBODIMENT (OVERLAP CONSIDERED DOT THINNING)

| | | | | |
|---|---|---|---|---|
| L1 | | 5-3 | | 5-3 |
| L2 | | 4-6 | | 4-6 |
| L3 | 3-7 | | 3-7 | |
| L4 | | 2-8 | | 2-8 |
| L5 | 1-9 | | 1-9 | |
| L6 | | 4-7 | | 4-7 |
| L7 | 3-8 | | 3-8 | |
| L8 | | 2-9 | | 2-9 |
| L9 | | 5-5 | | 5-5 |
| L10 | | 4-8 | | 4-8 |
| L11 | 3-9 | | 3-9 | |
| L12 | 6-5 | | 6-5 | |
| L13 | | 5-6 | | 5-6 |
| L14 | | 4-9 | | 4-9 |
| L15 | | 7-5 | | 7-5 |
| L16 | 6-6 | | 6-6 | |
| L17 | | 5-7 | | 5-7 |
| L18 | 8-5 | | 8-5 | |
| L19 | | 7-6 | | 7-6 |
| L20 | 6-7 | | 6-7 | |
| L21 | | 5-8 | | 5-8 |
| L22 | 8-6 | | 8-6 | |
| L23 | | 7-7 | | 7-7 |
| L24 | 6-8 | | 6-8 | |
| L25 | | 5-9 | | 5-9 |
| L26 | 8-7 | | 8-7 | |
| L27 | | 7-8 | | 7-8 |
| L28 | 6-9 | | 6-9 | |
| L29 | 9-5 | | 9-5 | |
| L30 | 8-8 | | 8-8 | |
| L31 | | 7-9 | | 7-9 |
| L32 | | 10-5 | | 10-5 |
| L33 | 9-6 | | 9-6 | |
| L34 | 8-9 | | 8-9 | |
| L35 | 11-5 | | 11-5 | |
| L36 | | 10-6 | | 10-6 |
| L37 | 9-7 | | 9-7 | |
| L38 | | 12-5 | | 12-5 |
| L39 | 11-6 | | 11-6 | |
| L40 | | 10-7 | | 10-7 |
| L41 | 9-8 | | 9-8 | |
| L42 | | 12-6 | | 12-6 |
| L43 | 11-7 | | 11-7 | |
| L44 | | 10-8 | | 10-8 |
| L45 | 9-9 | | 9-9 | |
| L46 | | 12-7 | | 12-7 |
| L47 | 11-8 | | 11-8 | |
| L48 | | 10-9 | | 10-9 |

(BLANK PIXEL POSITIONS HAVE NO DOT PRINTING)

DOT PRINTING SYSTEM, DOT PRINTING METHOD AND COMPUTER PROGRAM

BACKGROUND

1. Technical Field

The present invention relates to a technology in which dot printing is performed by outputting colorants.

2. Related Art

A typical device for performing dot printing by outputting colorants is an ink jet printer. In an ink jet printer, it is desirable to reduce the amount of ink used as much as possible thereby improving cost performance. In order to reduce the amount of ink used, the use of a method of omitting ink dots is known (for example, JP-A-2001-30522).

In the method of simply omitting ink dots, however, there is a problem that the image quality is excessively deteriorated due to reduced printing concentration and the like. Such a problem is not limited to ink jet printers but is common to colorant output devices in which dots are printed on a dot printing medium by outputting colorants.

SUMMARY

An advantage of some aspects of the invention is that a technology capable of reducing the amount of colorants for use in dot printing without deteriorating the image quality thereof excessively is provided.

Application 1

A dot printing system that performs a main scanning pass plural times in which dots are printed on a dot printing medium by outputting colorants from a plurality of nozzles of a colorant output head while moving the colorant output head in a main scanning direction, the colorant output head having the plurality of nozzles in a sub-scanning direction, and moves a relative position of the colorant output head and the dot printing medium at intermittent times of a plurality of the main scanning passes in the sub-scanning direction, in which the plurality of the main scanning passes includes a main scanning pass in which dots are printed by a nozzle of the plurality of nozzles different from a first nozzle among a plurality of dots printed by the first nozzle of the plurality of nozzles in the main scanning direction, and a main scanning pass in which dots are printed by a nozzle of the plurality of nozzles different from the first nozzle among a plurality of dots printed by the first nozzle in the sub-scanning direction; the dot printing system including: an omitting processor that performs an omitting process in which dots are not printed in the main scanning passes performed once or more and less than N times, in a case that the dot printing is completed with respect to a first main scanning line by the main scanning passes performed N times (N is an integer of 2 or more), in which the omitting processor performs the omitting process such that a first main scanning pass number indicating an order of the main scanning passes in which dots are printed with respect to the first main scanning line and a second main scanning pass number indicating an order of the main scanning passes in which dots are printed with respect to the second main scanning line adjacent to the first main scanning line in the sub-scanning direction, approach each other.

According to this configuration, since the main scanning pass number indicating an order of the main scanning passes to perform dot printing for adjacent main scanning lines in the sub-scanning direction selects a dot position to be omitted on each main scanning line on the basis of the main scanning pass to make adjacent main scanning lines approach each other, it is possible to reduce transmission errors of the sub-scanning accumulated between the main scanning passes to print adjacent main scanning lines. As a result, it is possible to reduce the amount of colorant used using the omitting without excessively deteriorating the image quality.

Application 2

In the dot printing system described in the application 1, the omitting processor performs the omitting process such that the difference between the first main scanning pass number and the second main scanning pass number is minimized.

According to this configuration, since the main scanning passes in which the difference between the main scanning pass numbers used to perform the dot printing in adjacent main scanning lines is minimized are left and other main scanning passes are omitted, it is possible to reduce transmission error of the sub-scanning accumulated between the main scanning passes to print adjacent main scanning lines.

Application 3

In the dot printing system described in the application 1 or application 2, the omitting processor performs the omitting process such that the first main scanning pass number and the second main scanning pass number become consecutive.

According to this configuration, since the main scanning pass number of at least one of the adjacent 2 main scanning lines and the number of the main scanning pass used to perform dot printing are consecutive, it is possible to make transmission error of the sub-scanning accumulated between the main scanning passes to print the adjacent main scanning lines extremely small.

Application 4

In the dot printing system described in any one of the applications 1 to 3, in a case where the omitting process at the second main scanning line is performed and then the omitting process at the first main scanning line is performed, the omitting processor performs the omitting process used to determine the first main scanning pass number on the basis of the second main scanning pass number.

According to this configuration, following a simple algorithm, it is possible to make the main scanning pass numbers indicating an order of the main scanning passes used to perform dot printing at adjacent main scanning lines as close as possible between the adjacent main scanning lines.

Further, the invention can be embodied in various forms. For example, the invention can be embodied in the forms of a printing method and printing apparatus, a colorant output device, a printing control method and printing control apparatus, a computer program to embody functions of the method or apparatus, and a printing medium having the computer program recorded therein.

BRIEF DESCRIPTION OF THE DRAWINGS

The invention will be described with reference to the accompanying drawings, wherein like numbers reference like elements.

FIG. 2 is an explanatory view showing a dot printing method in accordance with a first embodiment.

FIGS. 3A and 3B are explanatory views showing kinds of ink dots that can be formed in the ink jet printer.

FIGS. 4A and 4B are explanatory views showing omitting processes in a comparative example.

FIGS. 5A and 5B are explanatory views showing omitting processes in accordance with a first embodiment.

FIGS. 7A to 7C are conceptual views showing results obtained by printing without omitting, printing using an omitting process of a comparative example, and printing using the omitting of the embodiment.

FIGS. 8A and 8B are explanatory views showing comparative examples (omitting in a checkered pattern) in accordance with a first embodiment.

FIGS. 11A and 11B are explanatory view showing omitting process in accordance with a second embodiment.

DESCRIPTION OF EXEMPLARY EMBODIMENTS

Figure 1:
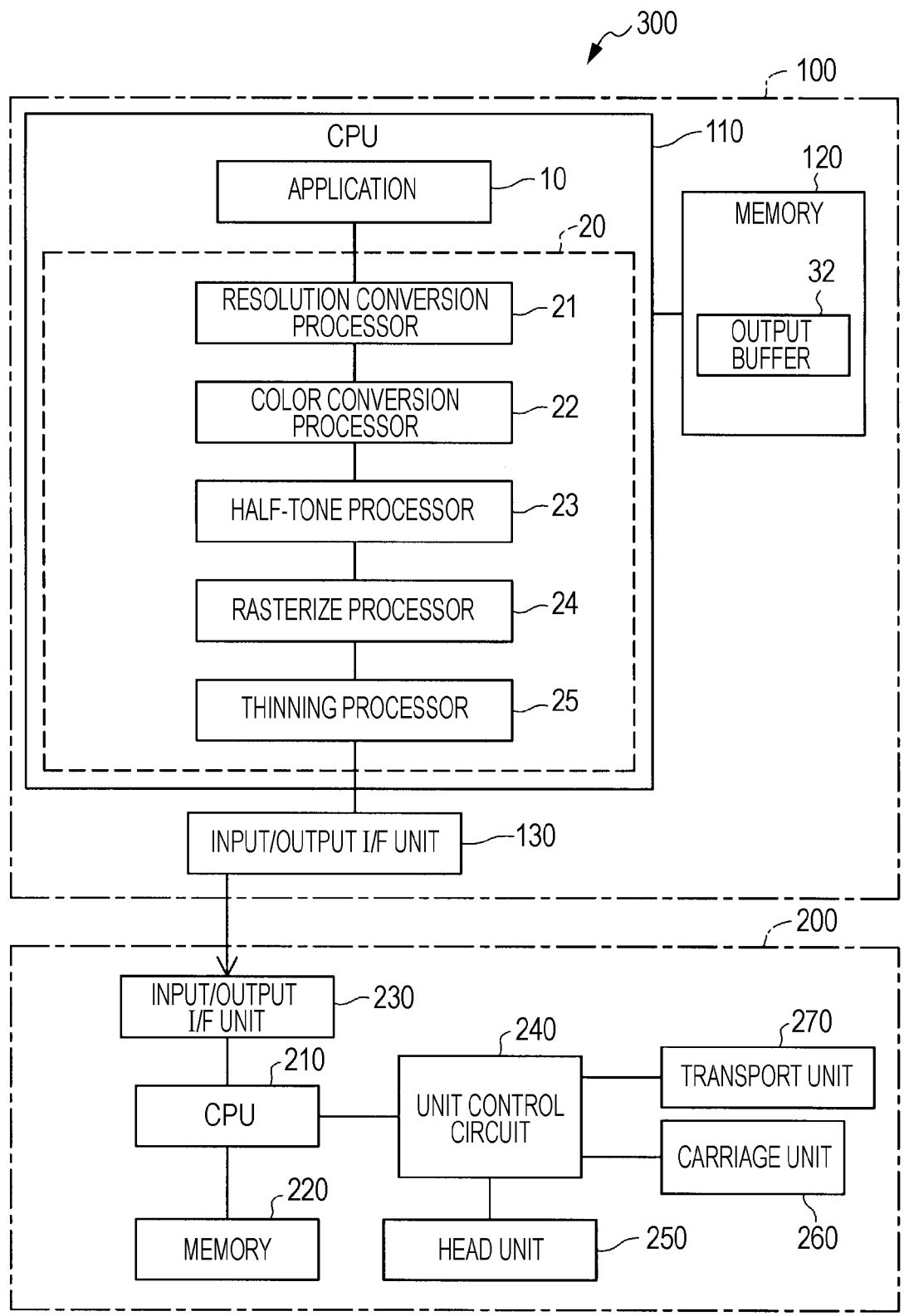
FIG. 1 is an explanatory view showing a configuration of a printing system in accordance with an embodiment of the invention.

Hereinafter, embodiments of the invention will be described in the order below.
A. Configuration of apparatus
B. First embodiment
C. Second embodiment
D. Modified example
A. Configuration of Apparatus FIG. 1 is an explanatory view showing a configuration of a printing system in accordance with an embodiment of the invention. The printing system 300 includes a personal computer 100 which is used as an image processor, and a printer 200 connected to the personal computer 100.

The personal computer 100 includes a CPU 110, a memory 120 and an input/output interface unit (I/F) 130. The memory 120 has an output buffer 32 to store printing data (dot data). The personal computer 100 has installed therein various kinds of computer programs such as an application program 10 and a printer driver 20. The application program 10 and the printer driver 20 are performed by the CPU 110 using a desired operating system (not shown). Further, the printer driver 20 may be operated in the computer 100 or in the printer 200.

The application program 10 is a program to embody an image editing function, for example. A user can give an instruction to print an image edited by the application program 10 through a user interface provided by the application program 10. The application program 10 outputs image data to be printed to the printer driver 20 when it is given an instruction from the user. Further, in accordance with the embodiment, the image data are outputted as RGB data.

The printer driver 20 is a program used to execute a function to generate print data on the basis of image data outputted from the application program 10. Here, the print data are data whose scheme can be analyzed by the printer 200, including various kinds of command data and dot data. The command data are data used to instruct the printer 200 to execute specific operations. The dot data are data to indicate the formative state of dots for pixels (printing pixels) that construct the image (printing image) to be printed, and in more detail, to show what color and what size the dots are to be formed (or not formed) with for each printing pixel. Here, "dot" refers to an ink zone formed when ink outputted from the printer 200 is impacted on a printing medium.

The printer driver 20 has a function to convert image data outputted from the application program 10 into printing data, which includes a resolution conversion processor 21, a color conversion processor 22, a half-tone processor 23, a rasterization processor 24 and an omitting processor 25.

The resolution conversion processor 21 makes a conversion of the resolution of image data outputted from the application program 10 to match a printing resolution of the printer 200. The color conversion processor 22 performs the color conversion process of the image data. The printer 200 used in the embodiment is a printer to perform printing using each color ink of Cyan (C), Magenta (M), Yellow (Y) and Black (K). In order to do so, the color conversion processor 22 converts pixel values expressed in RGB values into CMYK values. The half-tone processor 23 performs a half-tone process for the pixel values obtained after the color conversion so as to form dot data. For the half-tone process, it is possible to use random dithering and a dither scheme using a dither matrix, for example. Further, the printer 200 used in the embodiment is a printer that can form three kinds of dot sizes: a small size dot, a medium size dot and a large size dot. In the printer 200, however, the kinds of formable ink dot sizes are not limited to 3, and it is possible to use any printer that can form one or more kinds of dot sizes. The rasterization processor 24 arranges the dot data obtained in the half-tone process in a line in an order to be transmitted to the printer 200. The omitting processor 25 performs an omitting process to be described below with respect to the dot data. The dot data obtained after the omitting process are stored in the output buffer 32 and then outputted to the printer 200 through the input/output interface unit 130.

The printer 200 of the embodiment is an ink jet printer that prints images by forming ink dots on a printing medium. The printer 200 includes a CPU 210, a memory 220, an input/output interface unit 230, a unit control circuit 240 that controls various kinds of units according to instructions from the CPU 210, a head unit 250, a carriage unit 260 and a transport unit 270.

The head unit 250 has a print head (not shown) to output ink on a printing medium. The head unit 250 has a plurality of nozzles for each ink and intermittently outputs ink from each nozzle. The head unit 250 is mounted on the carriage unit 260. When the carriage unit 260 moves in a certain scanning direction (main scanning direction), the head unit 250 also moves in the main scanning direction. While the head unit 250 moves in the main scanning direction, it forms dot lines on the printing medium in the main scanning direction by intermittently outputting ink from the nozzle. Further, a main scanning line is also referred to as a "raster line" in this specification.

The carriage unit 260 is a driver to move the head unit 250 forward and backward in the main scanning direction. The carriage unit 260 has an ink cartridge to hold ink in addition to the head unit 250, the ink cartridge being maintained in the carriage unit in a mountable manner. The transport unit 270 is a driver to perform a sub-scanning by transporting the printing medium. The transport unit 270 includes a paper feed roller, a transport motor, a transport roller, a platen and a paper discharge roller (not shown), for example. Further, the print head may be transported in the sub-scanning direction instead of the printing medium.

B. First Embodiment

FIG. 2 is an explanatory view showing a dot printing method in accordance with a first embodiment. Nozzle column 250n mounted in a head unit is shown at the left portion of FIG. 2. The nozzle column 250n has 10 nozzles to discharge one kind of ink (for example, black ink). Nozzle columns for different ink are not shown. While tens to hundreds of nozzles are mounted for each kind of ink in actual printers, a nozzle column having small number of nozzles is described for the sake of convenience of drawing here. Numbers 0-9 attached to each nozzle position are nozzle identification numbers (ID). Pitch k of nozzles in the sub-scanning direction is 180 dpi, for example, and a print pixel pitch is 720 dpi, for example. In this case, nozzle pitch k is 4 [dot]. Generally, it is preferable that pitch k is an integer of 2 or more. The nozzle column 250n prints the dot on the printing medium during the performance of the main scanning in the main scanning direction (left and right direction in the drawing). Referring to FIG. 2, "pass" means the main scanning pass. Each time one main scanning pass is performed, the nozzle column 250n moves in the sub-scanning direction (up and down direction in the drawing). In this example, the transmission amount of sub-scanning is a fixed value of 5 dots, and the positions of the nozzle column 250n for 16 main scanning passes are indicated. Further, while the printing medium is moved in practice, it is described as though the nozzle column 250n is moved for the sake of convenience of illustration here.

Round marks having attached numbers that are described at the right portion of FIG. 2 indicate ink dots to be printed, and numbers in the circles indicate nozzle numbers. Symbols "L1" to "L48" are serial numbers attached to the main scanning lines. For example, on the main scanning line L1, dot printing is performed by nozzle numbers 8 and 3 in the manner in which pixels are alternated one by one. As can be understood by referring to the left portion of FIG. 2, the dot printing performed by the nozzle number 8 on the main scanning line L1 is performed in accordance with the pass 1, and the dot printing performed by the nozzle number 3 is performed in accordance with the pass 5. In this example, the printing of all dots on each main scanning line is completed by 2 main scanning passes. In other words, the printing of all the dots on each main scanning line is performed by 2 different nozzles. Such printing is referred to "2 pass printing". Further, in the description, printing in which the dot printing on each main scanning line is performed by the main-scanning N times using N nozzles is referred to "N pass printing", "N pass overlap printing" or simply "overlap printing". Further, N, which is the number of main scanning passes needed to complete the printing of each main scanning line, can be set as an arbitrary number of 2 or more. Generally, the reason that the printing of each raster line is performed by plural main scanning passes is as follows. That is, since it is possible that the dot printing position may slip slightly due to a dimensional error of the print head and a transmission error of the sub-scanning, 1 line is printed using a different plurality of nozzles so that the dot slippage is unlikely to become noticeable, thereby enhancing the image quality.

FIGS. 3A and 3B are explanatory views showing kinds of ink dots that can be formed in an ink jet printer. The printer can form 3 kinds of dot in a zone of 1 print pixel, that is, a large size dot, a medium size dot and a small size dot. The large size dot is generally used to print a solid area and a high concentration zone and the small size dot is generally used to print a low concentration zone. For example, the solid area is frequently printed using the large size dot only and a highlight zone (ultra low concentration zone) is frequently printed using the small size dot only. The medium size dot is used more frequently than the large and small size dots in a medium concentration zone. FIG. 3B shows a printed shape of the solid area of 3×5 pixels using large size dots. A range of 1 pixel is indicated by dotted lines. Further, 1 pixel may have a horizontally long-rectangular shape or a square shape. The large size dot is a dot that expands into a large zone, covering one pixel zone completely. The large size dot in the middle position is largely overlapped with each of the surrounding 8 large size dots. Further, since ink is generally discharged while the head moves in the main scanning direction (left and right direction in the drawing), dots tend to expand on the printing medium in the left and right direction. Accordingly, in the case of omitting the dots to reduce the amount of ink, when the dots are omitted in every other pixel in the main scanning direction, there is an advantage that the deterioration of image quality is not so noticeable.

FIG. 4A shows in detail a dot printing method in accordance with FIG. 2. Here, one frame indicates 1 pixel, and the frame of 1 pixel has therein a main scanning pass number and a nozzle number that are used to perform the dot printing of the pixel. Further, although only 4 pixels on each main scanning line are shown here, this same pattern is repeated several times in the horizontal direction. FIG. 4B shows a comparative example of the omitting method in accordance with the invention, which shows an embodiment in which dots of even number columns (even number pixel positions on the main scanning line) in FIG. 4A are omitted. The omitting method of the comparative example is an example of the simplest omitting process.

FIGS. 5A and 5B show details of the omitting process in accordance with a first embodiment. FIG. 5A is identical to FIG. 4A and shows in detail the dot printing method in accordance with FIG. 2. The omitting process of the first embodiment has characteristics as follows.

Characteristic 1. Instead of omitting an entire column and an entire row, some dots of each column and each row are omitted on the basis of the main scanning pass of the main scanning line.

Characteristic 2. The main scanning pass number used to perform the dot printing on each main scanning line between adjacent main scanning lines is selected to make the difference of consecutive main scanning pass numbers used to perform the dot printing as small as possible. In other words, referring to FIG. 5B, the main scanning pass numbers in lines L1-L4 are 5, 6, 7, 8, respectively, as opposed to 1, 6, 3, 8 (as in FIG. 4B).

The reason for employing the characteristic 1 is that when an entire column is omitted as shown in FIG. 4B, for example, the column becomes noticeable as void, and there occurs excessive deterioration in the image quality. It is also the same when an entire row (main scanning line) is omitted.

The reason for employing the characteristic 2 is that it reduces the transmission error of the sub-scanning occurring between the main-scanning passes that manage the dot printing for the adjacent main scanning lines. That is, since transmission error generally occurs whenever sub-scanning transmission is performed, sub-scanning transmission errors of n times are accumulated between 2 arbitrary main scanning passes interposed in which the sub-scanning transmission is performed n times. There, when a main scanning pass number used to perform the dot printing on each main scanning line is selected to make the difference of the main scanning pass numbers between adjacent main scanning lines to perform the dot printing as small as possible, it is possible to reduce the transmission error of the sub-scanning between these main scanning lines. As a result, it is possible to reduce the accumulated slippage in the ink impact position in the adjacent main scanning lines, thereby reducing the deterioration of image quality.

The kind of omitting process in the first embodiment can be a means to prevent excessive deterioration of image quality from occurring in the overlap printing (especially, the characteristic 2). In this meaning, this omitting process is also referred to "dot omitting in consideration of overlap".

Figure 6:
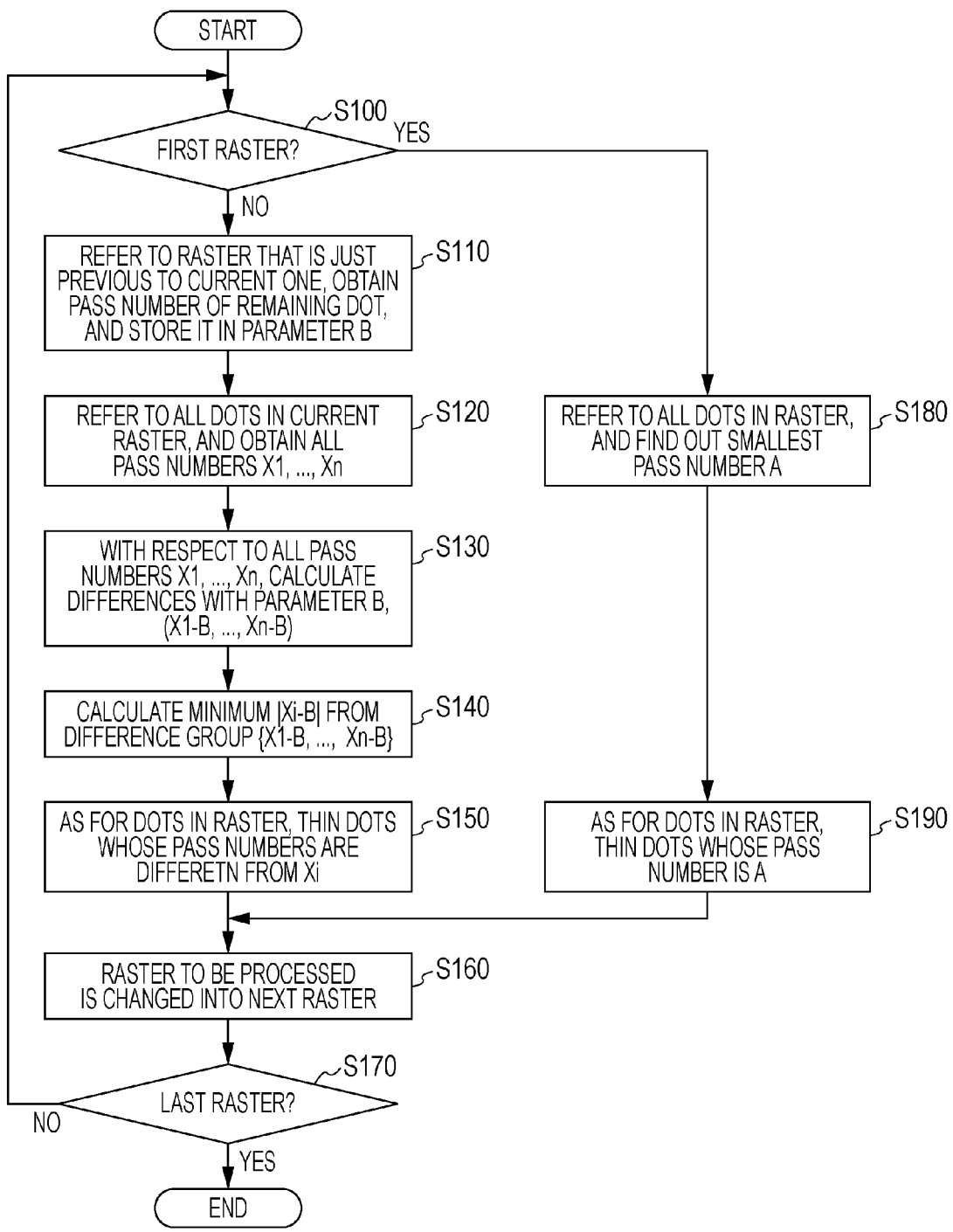
FIG. 6 is a flow chart illustrating an example of a method of selecting dots to be omitted in accordance with a first embodiment.

FIG. 6 is a flow chart illustrating an example of a method of selecting dots to be omitted in the omitting process of a first embodiment. This process is performed by the omitting processor 25 (FIG. 1). At step S100, it is determined whether a raster line to be processed (main scanning line) is a first raster line in the zone to be omitted. Further, whether the raster line is to be omitted or not can be determined by a determination reference set in advance. For example, a black solid area printed using only large size dots may be the only zone to be omitted. In the case that the raster line to be processed is the first raster line in the zone to be omitted, the process proceeds from step S100 to step S180, and the smallest main scanning pass number A is obtained with reference to all dot positions (pixel position) in the raster line is obtained. Referring to FIG. 5A, the smallest pass number A in all dot positions of the line L1 is 1. At step S190, the dot to be printed as the pass number A (=1) among dots in that line L1 is omitted. (referring to FIG. 5B).

At step S100, in the case that the raster line to be processed is not the first raster line, the process proceeds to step S110, and referring to the raster line that is just previous to the concerned raster line, a pass number B of the dot (hereinafter, referred to as "just previous line printing pass number B") that has been utilized (i.e. not omitted) in the just previous raster line is obtained. For example, referring to FIGS. 5A and 5B, in the case that the line L2 is to be processed, the pass number B of the dot that has been utilized in the just previous line L1 is 5, as opposed to the pass number of the dot that has been omitted, which is 1.

At step S120, referring to all dots in the current raster line, all pass numbers X1 to Xn to print all dots are obtained. At step S130, the differences between these pass numbers X1 to Xn and the just previous line printing pass number B are calculated, respectively. At step S140, the pass number Xi to give the minimum of these absolute values is obtained. Further, at step S150, among the dots on the raster line to be processed, the dots to be printed in the pass whose pass number is not the pass number Xi in which the absolute value of the difference has the minimum value are omitted. In the embodiments of FIGS. 5A and 5B, in the case that the line L2 is to be processed, it is determined that B=5, X1=2 and X2=6, and the pass number Xi that has the minimum absolute value of the difference obtained by comparison with B is 6. (|6−5|<|2−5|) Accordingly, the dot to be omitted is a dot in the pass number 2, and the dot to be utilized is a dot in the pass number 6.

As such, when the dot to be omitted on 1 raster line is determined, the next raster line in the sub-scanning direction is selected to be processed at step S160. Further, this process is not completed until the last raster line, the process returns from step S170 to step S100 and steps of S100 to S170 are repeatedly processed. As a result, as shown in FIG. 5B, the omitting process of the characteristics 1 to 2 is embodied.

The omitting results of the comparative example shown in FIG. 4B and of the first embodiment shown in FIG. 5B both have an omitting ratio of 50%. The inventor printed the solid area printed using the large size dots of black ink with 720 dpi in practice and compared the omitting results of the comparative example and the embodiment. However, the print head used was one in which the number of the black ink nozzles was 180 and the nozzle pitch was 180 dpi (k=4). Further, the transmission amount of the sub-scanning was fixed as a value of 90 dots.

FIGS. 7A to 7C are conceptual views showing printing results of black solid area in three cases of: no omitting, a comparative example (even number column omitting) and an embodiment (overlap considered omitting). In the even number column omitting of the comparative example, a result was obtained in which concentration irregularity of a horizontal stripe shape referred to banding as well as vertical stripes (white stripes in the sub-scanning direction) are noticeable. The reason is presumed to be that since the difference between the pass numbers of the main scanning passes that manage the dot printing of adjacent main scanning lines is great as a result of the even number column omitting as shown in FIG. 4B, the impact position slippage due to the transmission error of the sub-scanning therebetween appears as banding. Such banding also appears even when the dots are omitted in a checkered pattern. The reason is presumed to be that as shown in FIG. 8B by an example in which dots are omitted in a checkered pattern, there is a case in which the difference between the main scanning pass numbers that manage the dot printing of the adjacent main scanning lines is great, and the impact position slippage due to the transmission error of the sub-scanning therebetween appears as banding. Meanwhile, in the case of using the omitting process of the embodiment, a preferable result was obtained in which both horizontal strips and vertical stripes (bandings) seldom appeared and the deterioration of image quality was seldom noticeable as shown in FIG. 7C. The reason that the banding appearance is suppressed in the embodiment is that since the pass numbers to perform dot printing on each main scanning line were selected to make the difference between pass numbers to perform the dot printing between adjacent main scanning lines as small as possible, the impact position slippage between adjacent lines was small.

Figure 9A:
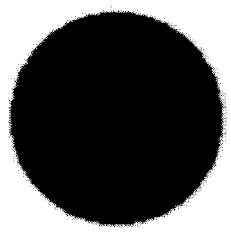
FIGS. 9A to 9C is a conceptual views showing different results obtained by printing without omitting, printing using an omitting process of a comparative examples, and printing using the omitting of the embodiment.
Figure 9B:
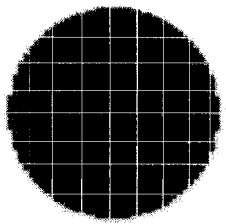
Figure 9C:
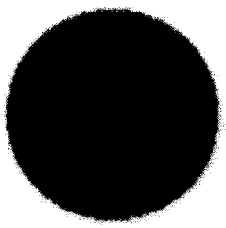

FIGS. 9A to 9C are conceptual views showing printing results for characters in 3 cases of: no omitting, a comparative example (even number column omitting), and an embodiment (overlap considered omitting). In the printing obtained by the omitting process of the comparative example, a result was obtained in which vertical stripes and horizontal stripes were noticeable in the interior of the character and jaggedness is noticeable at the edge portion. Meanwhile, in the printing obtained by the omitting process of the embodiment, banding seldom appeared and level of jaggedness at the edge portion was also insignificant.

As such, in the omitting process of the first embodiment, since the dot omitting in considered of overlap having the characteristics 1 to 2 is performed, it is possible to reduce the amount of ink used without excessively deteriorating the image quality.

C. Second Embodiment

Figure 10:
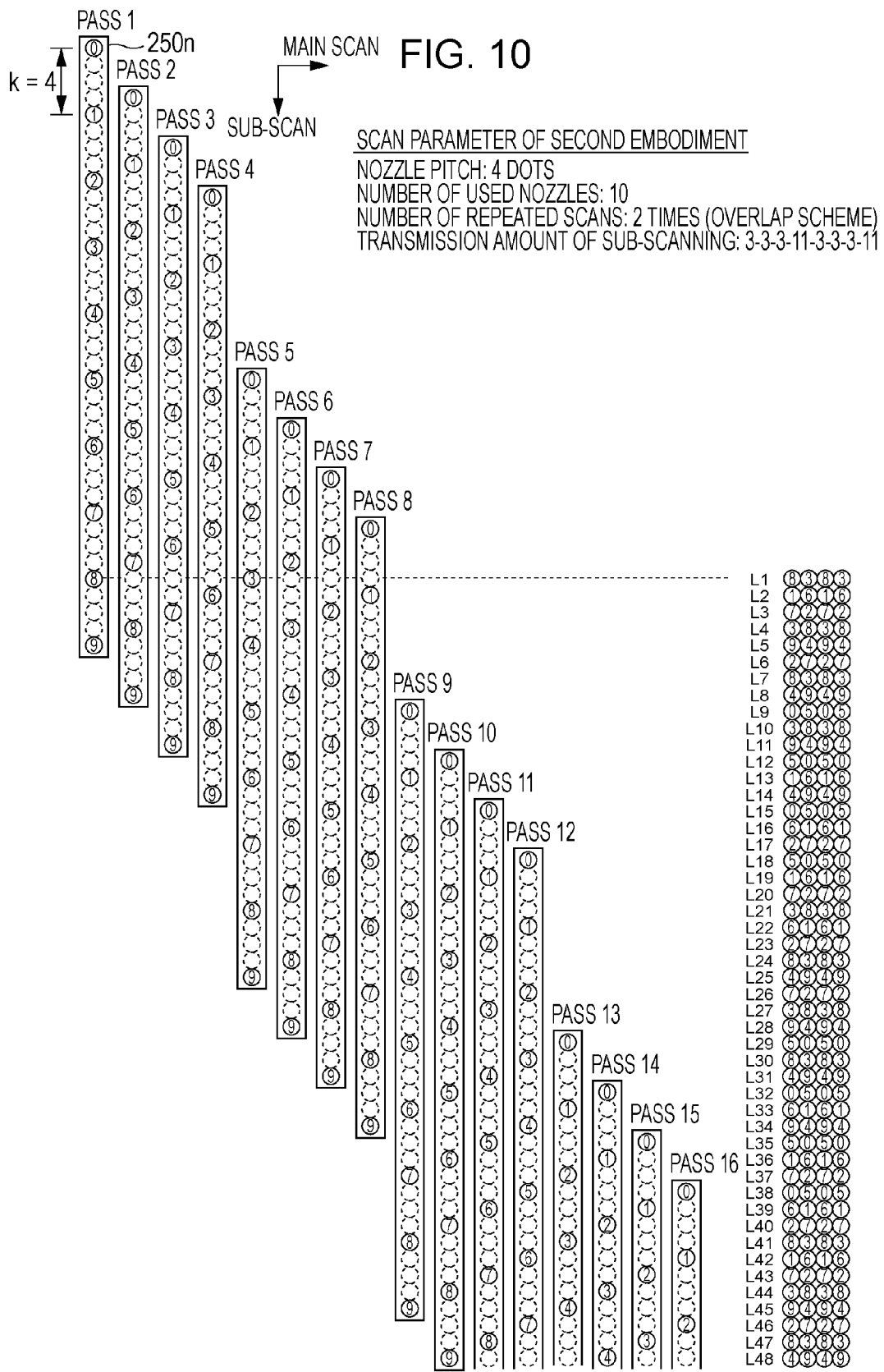
FIG. 10 is an explanatory view showing a dot printing method in accordance with a second embodiment.

FIG. 10 is an explanatory view showing a dot printing method in accordance with a second embodiment. The difference with FIG. 2 is the transmission amount of the sub-scanning only, and other than this, the scanning parameters and apparatus configuration are the same as those of the first embodiment. In a dot printing method of FIG. 10, the transmission amount of sub-scanning is expressed as a repeated pattern of (3 dots, 3 dots, 3 dots, 11 dots). As such, a sub-scanning method that uses the transmission amounts of sub-scanning of plural kinds is referred to as "irregular transmission". As shown in FIG. 2, meanwhile, a sub-scanning method using a fixed transmission amount of sub-scanning is referred to as "regular transmission". Like the regular transmission, the irregular transmission is also a scanning method in which dots can be printed in all pixel positions in the zone to be printed.

FIGS. 11A and 11B are explanatory views showing omitting processes in accordance with a second embodiment. The results of the omitting process of FIG. 11B were executed on the basis of the process flow shown in FIG. 6. As can be understood by comparing this result with FIG. 5B, it is possible to reduce the amount of ink used without excessively deteriorating the image quality when the dot omitting in consideration of overlap is performed even in case of the irregular transmission, like the case of the regular transmission.

D. Modified Example

Further, the invention is not restricted to the embodiment and the modified example, and can be embodied in various forms without departing from the principles of the invention. For example, the invention can be modified as follows.

D1. Modified Example 1

As for characteristics of the dot omitting in consideration of overlap, at least one of characteristics 3 and 4 to be described below may be added, in addition to the characteristics 1 and 2 described above.

Characteristic 3. The omitting process is performed in the zone printed by the large size dots only.

Characteristic 4. The dots to be omitted are selected from every other dot in the main scanning direction.

The characteristic 3 means that the omitting process is not performed in a zone where the medium and small size dots are used. The reason is that since the large size dot makes a large overlap with adjacent dots, deterioration of image quality does not occur excessively even though some of large size dots are omitted. Meanwhile, the medium and small size dots tend to make the image quality deteriorate when they are omitted since the medium size dot is slightly overlapped with adjacent dots and the small size dot is hardly overlapped with adjacent dots.

The reason for employing the characteristic 4 is as follows. Since dots tend to expand in the main scanning direction as shown in FIGS. 3A and 3B, when the dots are omitted every other dot in the main scanning direction, it is unlikely to deteriorate the image quality compared with the case in which the dots are omitted every other dot in the sub-scanning direction. Further, in the case that the pass number N is 3 or more, Q dots in consecutive N dots (Q is the quotient when N is divided by 2) may be omitted as non-consecutive pixel positions.

Further, a characteristic 4a may be employed, which describes "The dots to be omitted are selected at a ratio of one for every three dots in the main scanning direction", instead of the characteristic 4. The characteristic 4a has an advantage that the amount of ink can be reduced while excessive deterioration of image quality can be prevented by omitting one third of total dots when the overlapping of the large size dots is not great, for example. These characteristics 4 and 4a can be generalized to a characteristic 4b "The dots to be omitted are selected in a ratio of S dots for every T dots along the main scanning direction (T is an integer of 2 or more, S is an integer of 1 or more and less than T)". Such a characteristic 4b can be embodied by omitting the arbitrary number of dots in the dots whose pass number is not Xi in the order from high to low in the absolute values of differences obtained by comparing Xi with a variable B, at S150 in FIG. 6, for example.

Further, in the dot omitting process in consideration of overlapping, it is preferable that adjacent main scanning lines be printed by consecutive main scanning passes as much as possible. In the embodiment of FIG. 5B, it can be understood that the pass numbers of the main scanning passes used to perform the dot printing in the main scanning lines L1 to L4 are 5 to 8 and they are arranged consecutively. It is also the same in the lines L5 to L9, lines L10 to L14, lines L15 to L19, lines L20 to L24, . . . . As such, when the omitting process is performed to make the pass numbers of the main scanning passes used to perform the dot printing consecutive in most of the main scanning lines, it is possible to reduce the transmission error of the sub-scanning and to greatly reduce the deterioration of image quality caused by the transmission error of the sub-scanning.

D2. Modified Example 2

While the overlap print in which the pass number is 2 is described in the embodiment, the invention can be applied to an arbitrary overlap print whose pass number N is other than 2. In a case that there exist main scanning lines whose dot printing is completed with passes of 2 times and main scanning lines whose dot printing is completed with passes of 3 times, it may be that the dot omitting is not performed in the main scanning lines whose dot printing is completed with passes of 2 times and the dot omitting is performed in the main scanning lines whose dot printing is completed with passes of 3 times, for example. Further, a partial overlap printing method is disclosed in the publications of JP-A-2007-203717 and JP-A-2007-055202, for example.

D3. Modified Example 3

While the print head is moved in the main scanning direction in the embodiment, the printing paper may be moved instead of the print head.

D4. Modified Example 4

While an ink jet printer is described in the embodiment, the invention can be applied to other image recording devices such as facsimile machines and copying machines. Further, the invention can be applied to a colorant output device used to manufacture a color filter such as a liquid crystal display, an electrode material output devices used to form electrodes such as an organic EL display device and an FED (Field Emission Display), and other colorant output devices such as a bio organic matter output device used to manufacture biochips. Further, a "print head" in this specification corresponds to various kinds of recording heads used in image recording devices such as printers, colorant output devices used to manufacture color filters such as liquid crystal displays, electrode material output heads used to form electrodes such as organic EL displays and FEDs (Field Emission Displays), and bio organic matter output heads used to manufacture biochips. Further, the "printing medium" or "dot printing medium" of the invention is not limited thereto but means a medium on which dots are formed.

The disclosure of Japanese Patent Application No. 2009-025561 filed Feb. 6, 2009 including specification, drawings and claims is incorporated herein by reference in its entirety.

What is claimed is:

1. A printing apparatus that performs a plurality of main scanning passes in which dots are printed on a dot printing medium by outputting colorants from a plurality of nozzles of a colorant output head while moving the colorant output head in a main scanning direction, the colorant output head having the plurality of nozzles in a sub-scanning direction, and moves a relative position of the colorant output head and the dot printing medium at discrete time intervals in the sub-scanning direction, each discrete time interval corresponding to one of the main scanning passes, wherein the plurality of the main scanning passes includes a first main scanning pass in which dots are printed by a first one of the nozzles to form a first main scanning line, and a second main scanning pass in which dots are printed by a second one of the nozzles to form a second main scanning line immediately subsequent to the first main scanning line, the first and second main scanning passes being designated by a first and a second main scanning pass number, respectively, each main scanning pass number indicating an order of the respective main scanning pass relative to the other main scanning passes; the printing apparatus comprising:

an omitting processor that performs an omitting process in which dots are not printed at one or more of the main scanning passes;

wherein the omitting processor performs the omitting process by:

selecting a combination of the first and second main scanning passes such that a difference between the first main scanning pass number and the second main scanning pass number is lower than for other possible combinations of the first and second main scanning passes;

utilizing the selected combination of the first and second main scanning passes to print the dots; and omitting at least one other possible first or second main scanning pass, wherein the other possible main scanning pass does not constitute part of the selected combination.

2. The printing apparatus of claim 1, wherein selecting the combination comprises inputting a previously selected first main scanning pass number, and selecting the second main scanning pass by selecting a smallest possible difference between each possible second main scanning pass number and the previously selected first main scanning pass number.

3. A printing method, comprising:

performing a plurality of main scanning passes for printing dots on a dot printing medium by outputting colorants from a plurality of nozzles of a colorant output head while moving the colorant output head in a main scanning direction, the colorant output head having the plurality of nozzles in a sub-scanning direction, and moving a relative position of the colorant output head and the dot printing medium in the sub-scanning direction at discrete time intervals, each discrete time interval corresponding to one of the main scanning passes, wherein the plurality of the main scanning passes includes a first main scanning pass in which dots are printed by a first one of the nozzles to form a first main scanning line, and a second main scanning pass in which dots are printed by a second one of the nozzles to form a second main scanning line immediately subsequent to the first main scanning line, the first and second main scanning passes being designated by a first and a second main scanning pass number, respectively, each main scanning pass number indicating an order of the respective main scanning pass relative to the other main scanning passes; and performing an omitting process in which dots are not printed at one or more of the main scanning passes;

wherein the omitting process comprises:

selecting a combination of the first and second main scanning passes such that a difference between the first main scanning pass number and the second main scanning pass number is lower than for other possible combinations of the first and second main scanning passes;

utilizing the selected combination of the first and second main scanning passes to print the dots; and omitting at least one other possible first or second main scanning pass, wherein the other possible main scanning pass does not constitute part of the selected combination.

4. The method of claim 3, wherein selecting the combination comprises inputting a previously selected first main scanning pass number, and selecting the second main scanning pass by selecting a smallest possible difference between each possible second main scanning pass number and the previously selected first main scanning pass number.

5. A non-transitory computer-readable medium, storing thereon a computer program product that generates printing data to be provided to a printing apparatus in a computer in order to perform dot printing, wherein the printing apparatus is configured to perform a plurality of main scanning passes for printing dots on a dot printing medium by outputting colorants from a plurality of nozzles of a colorant output head while moving the colorant output head in a main scanning direction, the colorant output head having the plurality of nozzles in a sub-scanning direction, and moves a relative position of the colorant output head and the dot printing medium in the sub-scanning direction at discrete time intervals, each discrete time interval corresponding to one of the main scanning passes, wherein the plurality of the main scanning passes includes a first main scanning pass in which dots are printed by a first one of the nozzles to form a first main scanning line, and a second main scanning pass in which dots are printed by a second one of the nozzles to form a second main scanning line immediately subsequent to the first main scanning line, the first and second main scanning passes being designated by a first and a second main scanning pass number, respectively, each main scanning pass number indicating an order of the respective main scanning pass relative to the other main scanning passes, the computer program product causing the computer to execute the functions of:

performing an omitting process in which dots are not printed at one or more of the main scanning passes;

wherein the omitting process comprises:

selecting a combination of the first and second main scanning passes such that a difference between the first main scanning pass number and the second main scanning pass number is lower than for other possible combinations of the first and second main scanning passes;

utilizing the selected combination of the first and second main scanning passes to print the dots; and omitting at least one other possible first or second main scanning pass, wherein the other possible main scanning pass does not constitute part of the selected combination.

6. The medium of claim 5, wherein selecting the combination comprises inputting a previously selected first main scanning pass number, and selecting the second main scanning pass by selecting a smallest possible difference between each possible second main scanning pass number and the previously selected first main scanning pass number.

* * * * *